(12) United States Patent
Pramod et al.

(10) Patent No.: US 11,511,630 B2
(45) Date of Patent: Nov. 29, 2022

(54) ACTIVE CONTROL OF SUPPLY CURRENT DYNAMICS FOR SYNCHRONOUS MOTOR DRIVES

(71) Applicant: STEERING SOLUTIONS IP HOLDING CORPORATION, Saginaw, MI (US)

(72) Inventors: Prerit Pramod, Saginaw, MI (US); Jeffery A. Zuraski, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 502 days.

(21) Appl. No.: 16/671,633

(22) Filed: Nov. 1, 2019

(65) Prior Publication Data

US 2020/0189399 A1    Jun. 18, 2020

Related U.S. Application Data

(60) Provisional application No. 62/754,130, filed on Nov. 1, 2018.

(51) Int. Cl.
| | |
|---|---|
| *H02P 6/12* | (2006.01) |
| *B60L 50/16* | (2019.01) |
| *H02K 19/16* | (2006.01) |
| *H02K 19/02* | (2006.01) |
| *H02P 6/28* | (2016.01) |

(52) U.S. Cl.
CPC .............. *B60L 50/16* (2019.02); *H02K 19/02* (2013.01); *H02K 19/16* (2013.01); *H02P 6/28* (2016.02); *B60L 2220/14* (2013.01)

(58) Field of Classification Search
CPC .......... B60L 50/16; H02P 6/28; H02K 19/02; H02K 19/16

USPC ................................................ 318/400.15
See application file for complete search history.

(56) References Cited

U.S. PATENT DOCUMENTS

| | | | |
|---|---|---|---|
| 8,896,244 B2 | 11/2014 | Kleinau | |
| 2011/0057510 A1* | 3/2011 | Yamashita | B62D 6/02 307/10.1 |
| 2011/0273127 A1* | 11/2011 | Imamura | H02P 6/08 318/650 |
| 2013/0149628 A1* | 6/2013 | Ogawa | H01M 8/04225 429/450 |
| 2019/0241208 A1* | 8/2019 | Takase | H02P 21/05 |

(Continued)

FOREIGN PATENT DOCUMENTS

| | | |
|---|---|---|
| DE | 69707265 T2 | 6/2002 |
| DE | 102017121554 A1 | 3/2018 |

(Continued)

OTHER PUBLICATIONS

U.S. Appl. No. 14/090,484, filed Nov. 26, 2013.

(Continued)

*Primary Examiner* — Erick D Glass
(74) *Attorney, Agent, or Firm* — Dickinson Wright PLLC

(57) ABSTRACT

A motor control system is configured to: determine a current supply limit for an electric motor; receive a current supply of the electric motor; identify one or more motor commands; adjust the one or more motor commands in response to a determination that the current supply is greater than the current supply limit; and selectively control the electric motor using the adjusted one or more motor commands.

16 Claims, 5 Drawing Sheets

(56) References Cited

U.S. PATENT DOCUMENTS

2020/0039577 A1\* 2/2020 Kataoka ................ B62D 6/008

FOREIGN PATENT DOCUMENTS

DE 102016123741 A1 6/2018
WO 9736777 A1 10/1997

OTHER PUBLICATIONS

U.S. Appl. No. 14/608,375, filed Jan. 29, 2015.
U.S. Appl. No. 16/039,788, filed Jul. 19, 2018.
U.S. Appl. No. 15/804,190, filed Nov. 6, 2017.
U.S. Appl. No. 16/049,921, filed Jul. 31, 2018.
Official Letter from the German and Patent Trademark Office for related German Application No. 102019129509.2 dated Feb. 2, 2022, 14 page(s).

\* cited by examiner

ACTIVE CONTROL OF SUPPLY CURRENT DYNAMICS FOR SYNCHRONOUS MOTOR DRIVES

CROSS-REFERENCES TO RELATED APPLICATIONS

This patent application claims priority to U.S. Provisional Patent Application Ser. No. 62/754,130, filed Nov. 1, 2018, which is incorporated herein by reference in its entirety.

BACKGROUND

Vehicles, such as cars, trucks, sport utility vehicles, crossovers, mini-vans, or other suitable vehicles, are increasingly including various electric motor drives to operate or drive various features of the vehicle, including windshield wipers, power windows, vehicle propulsion, and so on. Power management in a typical electric motor drive is performed by controlling a supply current limit that the electric motor drive draws from a power source. Controlling the supply current limit may include actively predicting a supply current consumption for the electric motor drive for a given operating condition and, thereafter, modifying a motor torque or current command of the electric motor drive accordingly. Such control of the electric motor drive maybe referred to as feedforward control or model-based control.

Due to complexity of a mathematical model used to describe an electric motor control system, this feedforward control or model-based control approach may be relatively complex and, therefore, burdensome for associated computing resources to perform particularly in a limited duration, such as at real-time or substantially real-time. Additionally, as complexity of such electric motor drives continues to increase, dynamic characteristics are typically ignored using such approaches due in part to the increase in complexity.

SUMMARY

This disclosure relates generally to active control of supply current dynamics for synchronous motor drives using closed-loop control.

An aspect of the disclosed embodiments includes a motor control system. The motor control system includes a processor and a memory. The memory includes instructions that, when executed by the processor, cause the processor to: determine a current supply limit for an electric motor; receive a current supply of the electric motor; identify one or more motor commands; adjust the one or more motor commands in response to a determination that the current supply is greater than the current supply limit; and selectively control the electric motor using the adjusted one or more motor commands.

Another aspect of the disclosed embodiments includes a method for motor control. The method includes determining a current supply limit for an electric motor. The method also includes receiving a current supply of the electric motor. The method also includes identifying one or more motor commands. The method also includes adjusting the one or more motor commands based on the current supply and the current supply limit. The method also includes selectively controlling the electric motor using the adjusted one or more motor commands.

Another aspect of the disclosed embodiments includes a steering system. The steering system includes a synchronous motor drive, a processor, and a memory. The synchronous mote drive is associated with a vehicle. The processor is in communication with the synchronous motor drive and configured to selectively control the synchronous drive. The memory that includes instructions that, when executed by the processor, cause the processor to: determine a current supply limit for the synchronous motor drive; receive a current supply of the synchronous motor drive; actively generate a torque limit based on the current supply limit in response to a determination that the current supply is greater than the current supply limit; and selectively control the synchronous motor drive using the torque limit.

These and other advantages and features will become more apparent from the following description taken in conjunction with the drawings.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity FIG. 1 generally illustrates an example steering system according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, Vehicles, such as cars, trucks, sport utility vehicles, crossovers, mini-vans, or other suitable vehicles, are increasingly including various electric motor drives to operate or drive various features of the vehicle, including windshield wipers, power windows, vehicle propulsion, and so on. Power management in a typical electric motor drive is performed by controlling a supply current limit that the electric motor drive draws from a power source. Controlling the supply current limit may include actively predicting a supply current consumption for the electric motor drive for a given operating condition and, thereafter, modifying a motor torque or current command of the electric motor drive accordingly. Such control of the electric motor drive maybe referred to as feedforward control or model-based control.

Due to complexity of a mathematical model used to describe an electric motor control system, this feedforward control or model-based control approach may be relatively complex and, therefore, burdensome for associated computing resources to perform particularly in a limited duration, such as at real-time or substantially real-time. Further, as complexity of such electric motor drives continues to increase, dynamic characteristics are typically ignored using such approaches due in part to the increase in complexity. In addition to such technical challenges, the feedforward control approach and the model-based control approach lack sensitivity under parameter estimation errors (e.g., sometimes referred to as modeling uncertainty).

Figure 1:
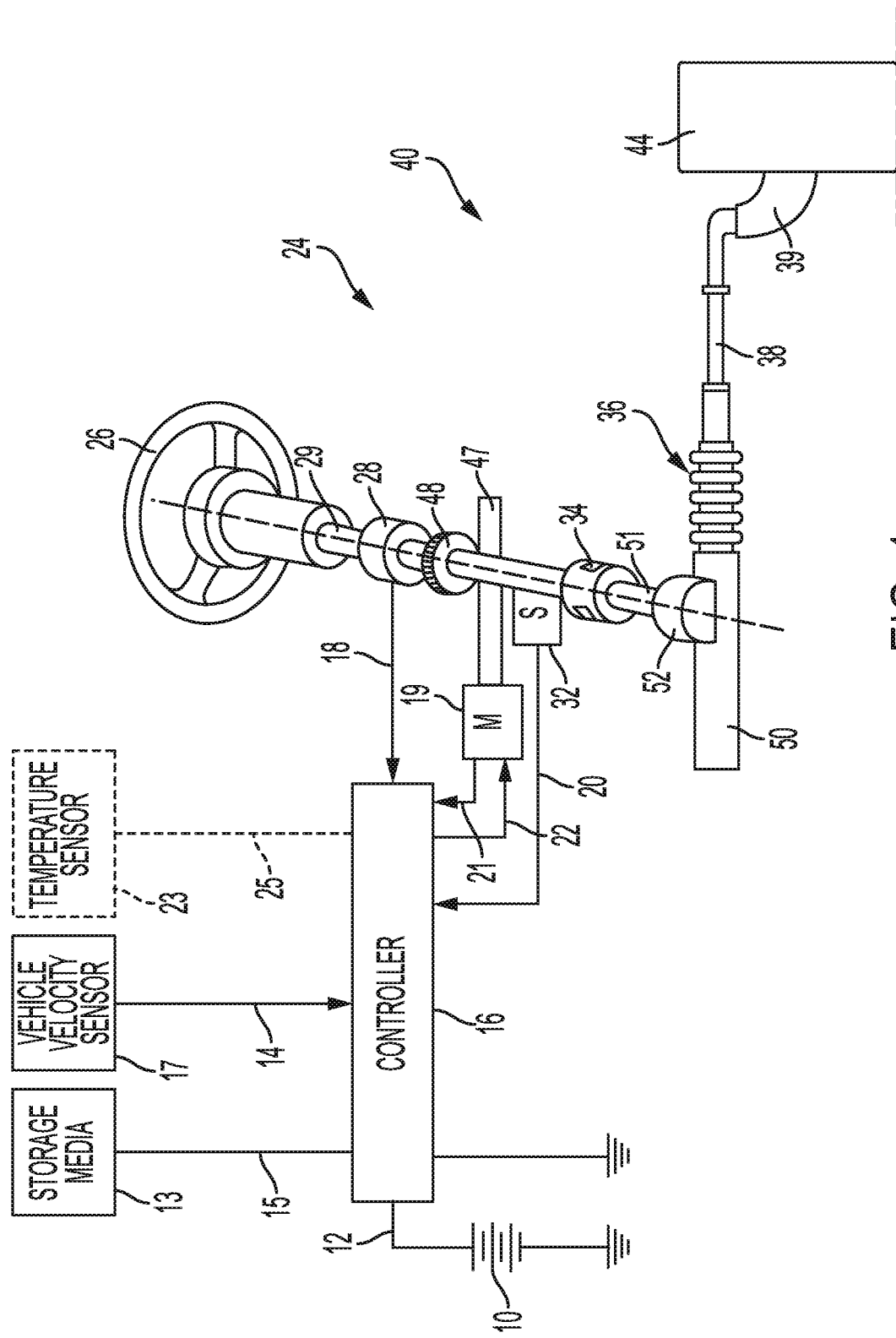

Referring now to the Figures, where the technical solutions will be described with reference to specific embodiments, without limiting same, FIG. 1 generally illustrates an electric power steering system (EPS) 40 according to the principles of the present disclosure. The EPS 40 includes a steering mechanism 36. The steering mechanism 36 may include a rack-and-pinion type system. The steering mechanism 36 may include a toothed rack disposed within housing 50 and a pinion gear generally disposed under gear housing 52.

The EPS 40 includes an operator input 26. The operator input 26 may include a steering wheel, such as a hand wheel and he like, or other suitable input. As the operator input 26, hereinafter referred to as a steering wheel 26 is rotated (e.g., turned), an upper steering shaft 29 rotates (e.g., turns) and a lower steering shaft 51, connected to or in mechanical communication with the upper steering shaft 29 through universal joint 34, rotates (e.g., turns) the pinion gear. Rotation of the pinion gear causes the rack to move, which causes one or more tie rods 38 to move. Movement of the rack causes steering knuckles 39 to move, which rotates (e.g., turns) one or more a steerable wheel 44.

In some embodiments, electric power steering assist is provided through a control apparatus generally designated by reference numeral 24. The control apparatus 24 includes a controller 16 and an electric machine 46. The electric machine 46 may include a permanent magnet synchronous motor or other suitable electric machine. The electric machine 46 is hereinafter referred to as motor 46.

In some embodiments, a vehicle power supply 10 may be configured to provide power (e.g., electric power or other suitable power) to the controller 16. For example, the vehicle power supply 10 may be in connected to the controller 16 via line 12. The vehicle power supply 10 may provide electric power to the controller 16 via the line 12.

In some embodiments, the controller 16 may receive a vehicle speed signal 14. For example, a vehicle velocity sensor 17 may be configured to sense or measure a vehicle speed of the vehicle. The vehicle velocity sensor 17 may generate and/or communicate the vehicle speed signal 14 to the controller 16.

In some embodiments, a position sensor 32 may be configure to measure or sense a steering angle. The position sensor 32 may include an optical encoding type sensor, a variable resistance type sensor, or any other suitable type of position sensor. The position sensor 32 may generate and/or communicate a position signal 20 to the controller 16. The position signal 20 may be representative of the steering angle.

In some embodiments, a motor velocity may be measured with a tachometer, or any other device. The tachometer may communicate a motor velocity signal 21 to the controller 16. The motor velocity signal 21 may be representative of the motor velocity. A motor velocity ($\omega_m$) may be measured, calculated, or a combination thereof. For example, the motor velocity $\omega_m$ may be calculated as a change of a motor position $\theta$ as measured by the position sensor 32 over a predetermined period. The motor velocity $\omega_m$ may be determined as the derivative of the motor position $\theta$ from the equation:

$$\omega_m = \Delta\theta/\Delta t$$

Where $\Delta t$ is a sampling time and $\Delta\theta$ is a change in position during the sampling time. Additionally, or alternatively, the motor velocity may be derived from motor position as a time rate of change of position. It will be appreciated that there are numerous well-known methodologies for performing the function of a derivative.

As the steering wheel 26 is rotated (e.g., turned), torque sensor 28 senses a torque applied to the steering wheel 26 by a vehicle operator. The torque sensor 28 may include a torsion bar and a variable resistive-type sensor, which outputs a variable torque signal 18 to the controller 16 in relation to the amount of axial rotation that is applied to the torsion bar. It should be understood that, while limited examples are provided herein, the torque sensor 28 may include any suitable torque-sensing device used with known signal processing techniques. In response to the various inputs, the controller 16 generates and communicates a command 22 to the electric motor 46. The electric motor 46 may be configured to provide torque assist to the steering system through worm 47 and worm gear 48, which may providing torque assist to the vehicle steering.

It should be understood that although the disclosed embodiments are described by way of reference to motor control for electric steering applications, it should be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed, and the like. It should also be understood that reference herein to electric machines including, but not limited to, motors, hereafter, for brevity and simplicity, reference will be made to motors only without limitation.

In some embodiments, the controller 16 may use torque, position, speed, and like, to generate one or more a commands to deliver the desired output power of the electric machine 46. For example, the controller 16 may be in communication with the various systems and sensors of the motor control system. The controller 16 may receive various signals from each of the sensors. The controller 16 may be configured to quantified information associated with the received signals. The controller 16 may provide one or more output command signal in response to the quantified information. For example, the controller 16 may provide the one or more output commands to the motor 46.

In some embodiments, the controller 16 is configured to develop one or more corresponding voltages out of an inverter. In some embodiments, the inverter may be incorporated within the controller 16, such that, when applied to the motor 46, a desired torque or position is generated.

In some embodiments, the controller 16 may be configured to operate in a feedback control mode (e.g., as a current regulator), to generate the command 22. In some embodiments, the controller 16 may be configured to operate in a feedforward control mode to generate the command 22. In some embodiments, the command 22 may be determined (e.g., by the controller 16) based on the position and/or speed of the motor 46 and/or the desired torque, a described (e.g., because the voltages associated with the command 22 are related to the position and speed of the motor 46 and the desired torque). For example, the controller 16 may determine the position and/or speed of the rotor and the torque applied by an operator of the vehicle.

In some embodiments, a position encoder may be connected to a steering shaft 51. The position encoder maybe configured to detect an angular position θ. The position encoder may sense a rotary position based on optical detection, magnetic field variations, other methodologies, or a combination thereof. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

The controller 16 may be configured to determine the desired torque using one or more torque sensors 28 transmitting torque signals 18 indicative of an applied torque. In some embodiments, such a torque sensor 28 may generate one or more torque signals 18 therefrom, and may be responsive to a compliant torsion bar, T-bar, spring, or similar apparatus configured to provide a response indicative of the torque applied.

In some embodiments, one or more temperature sensors 23 may be disposed on or proximate the motor 46. The temperature sensor 23 may be configured to directly or indirectly measure a temperature of a sensing portion of the motor 46. The temperature sensor 23 is configured to communicate a temperature signal 25 to the controller 16 (e.g., to facilitate the processing prescribed herein and compensation). The one or more temperature sensors 23 may include thermocouples, thermistors, thermostats, other suitable sensors, or a combination thereof. The one or more temperature sensors 23, when appropriately disposed on or proximate the motor 46 may provide a calibratable signal proportional to a particular temperature.

The position signal 20, velocity signal 21, and a torque signal(s) 18 among others, are communicated to the controller 16, as described. The controller 16 uses all input signals to generate values corresponding to each of the signals resulting in a rotor position value, a motor speed value, and a torque value (e.g., which may be used as will be described herein). The various measurement signals, such as those described herein, may be linearized, compensated, and filtered (e.g., by the controller 16 or other suitable device) to enhance characteristics or eliminate undesirable characteristics of the various signals received by the controller 16. For example, the various signals may be linearized to improve processing speed, or to address a large dynamic range of the signal. Additionally, or alternatively, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), the controller 16 may include, but not be limited to, one or more processors, one or more computers, one or more digital signal processors (DSP), memory, storage, one or more registers, timing, one or more interrupts, one or more communication interfaces, one or more input/output signal interfaces, and the like, or a combination thereof. For example, the controller 16 may include input signal processing and filtering to enable accurate sampling and conversion or acquisitions of such signals from communications interfaces. Additional features of the controller 16 and certain processes therein are thoroughly discussed herein.

In some embodiments, the technical solutions described herein facilitate a closed-loop or feedback control approach for supply current limiting (e.g., power management). It should be understood that, although the technical solutions are described herein using embodiments of steering system, the technical solutions are applicable to any other motor control system that is used in any other application, such as motor pumps, industrial belts, and the various such applications.

As described herein, power management in electric motor drives is typically performed by controlling the supply current limit that the system draws from a power source. This controlling (e.g., sometimes referred to as limiting) is performed by actively predicting a supply current consumption for the motor drive for a given operating condition and thereafter modifying a motor torque or one or more current commands of the motor drive, accordingly. Due to the complexity of a mathematical model used to describe an electric motor control system, this feedforward control or model-based control approach may be relatively complex and, therefore, burdensome for associated computing resources to perform particularly in a limited duration, such as at real-time or substantially real-time. Further, as complexity of such electric motor drives continues to increase, dynamic characteristics are typically ignored using such approaches due in part to the increase in complexity. In addition to such technical challenges, the feedforward control approach and the model-based control approach lack sensitivity under parameter estimation errors (e.g., sometimes referred to as modeling uncertainty).

The technical solutions described herein address the technical challenges described herein. In some embodiments, a measurement of the supply current is utilized to perform the limiting actively. This measurement may be sensed or measured by a direct sensor or an observer that re-constructs the signal utilizing the model of the power supply circuit of the drive system. It should be understood that this is a not a typical closed-loop control system that uses a regulation or tracking problem, rather it is a conditional regulator. Further, according to some embodiments, the technical solutions described herein improve tunability and implementation of the conditional regulator for both, supply and regenerative current limiting together.

The active control of the power supply current or power using feedback is not a tracking control problem, rather it is an anti-windup problem. As is generally illustrated FIG. 2, the motor torque control dynamics are assumed to be in the linear operation range for the purposes of the discussion herein. However, the technical solutions described herein are applicable under all operating conditions as will be readily noted by a person skilled in the art.

The torque control dynamics can be simplified (as will be described) which may allow for considering all electric motor drives (e.g. for brushed DC motors, synchronous motors, etc.) irrespective how the torque control is achieved. Next, the "regulator" is implemented in such a way that it actively produces a torque limit $T_l$ that limits the base torque command. Note that only positive supply current and torque is considered here, however, an extension of the technical solutions described herein the can operate using the negative side is straightforward. When the base torque command exceeds the limit, the torque saturation block becomes active. Further, when the supply current limit $I_{s*}$ is larger than the measured or estimated supply current $I_s$ the supply current regulator block is inactive and is only activated when the latter exceeds the former.

Figure 3:
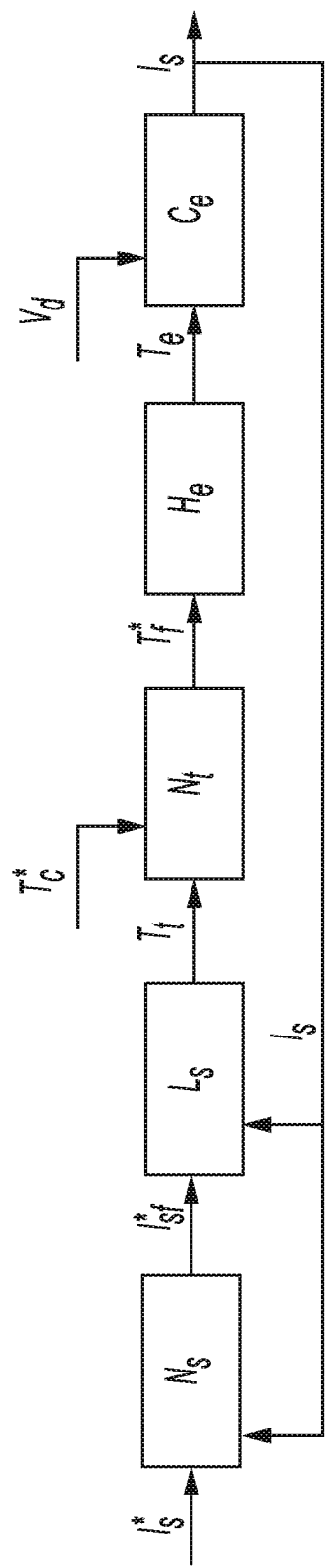
FIG. 3 generally illustrates a supply current control structure with torque command as control signal according to the principles of the present disclosure.

When both the torque and supply current blocks are active, the closed loop block diagram may be drawn as is generally illustrated in FIG. 3. Because the limitations are active, the block equations may be described as follows:

$$T_l = L_{sc}I^*_{sf} - L_{sm}I_s$$

$$T^*_f = T_l$$

$$T_e = H_e T^*_f$$

$$I_s = C_d V_d + C_e T_e$$

As can be seen, under the limitation conditions, the control loop is operating linearly. These equations can result in the following closed loop equations.

$$I_s = C_d V_d + C_e T_e$$
$$= C_d V_d + C_e H_e T^*_f$$
$$= C_d V_d + C_e H_e T_l$$
$$= C_d V_d + C_e H_e (L_{sc}I^*_{sf} - L_{sm}I_s)$$
$$(1 + C_e H_e L_{sm})I_s = C_d V_d + C_e H_e L_{sc}I^*_{sf}$$

Accordingly, the closed loop transfer function in this case becomes:

$$M_n = \frac{I_s}{I^*_{sf}} = \frac{C_e H_e L_{sc}}{1 + C_e H_e L_{sm}}$$

Although an integrator can be used within the supply current controller block to track step commands, the following controller structure can be used to address the technical challenged described herein.

$$L_{sc} = L_{sm} = \frac{K_i}{s}$$

The above controller works optimally when the control loop operates linearly. Further, the analytical treatment of the control design facilitates designing and tuning the controller appropriately. However, a technical challenge arises when the linear operation of the above controller ceases. For instance, consider that the torque limitation is not active even though the supply current limitation is active. In this case, the supply current regulator output can be completely ignored resulting in an undesirable controller windup situation and thus, an anti-windup controller for this situation is required. Next, consider the situation when the supply current is below a predetermined limit. In this situation, the controller output is infinity (i.e. the base torque command is not limited at all). Again, the integrator windup has to be avoided through appropriate control blocks as needed. However, if the error is simply set to zero under this condition, the integrator is not able to transition the true input and hence, the output to steady state values. In the simplest case, the error may be left unconstrained. In this case, the closed loop transfer functions may be described as follows:

$$T_l = L_s(I^*_{sf} - I_s) - K_{ta}(T^*_f - T_l)$$

$$I_s = C_d V_d + C_e H_e T^*_f$$

-continued $$T^*_f = (C_e H_e)^{-1}(I_s - C_d V_d)$$

$$T^*_f - T_l = \frac{1}{C_e H_e}I_s - \frac{C_d}{C_e H_e}V_d - L_s(I^*_{sf} - I_s) - K_{ta}(T^*_f - T_l)$$

$$(1 + K_{ta})(T^*_f - T_l) = \left(\frac{1}{C_e H_e} + L_s\right)I_s - \frac{C_d}{C_e H_e}V_d - L_s I^*_{sf}$$

$$I_s = \frac{C_e H_e L_s}{1 + C_e H_e L_s}I^*_{sf} + \frac{C_d}{1 + C_e H_e L_s}V_d + \frac{C_e H_e(1 + K_{ta})}{1 + C_e H_e L_s}(T^*_f - T_l)$$

Some of the disclosed embodiments herein may include another anti-windup feedback from a saturation block at the output of the integrator, which regulates the output to the unlimited torque command $T_c$. In that case, the new equations may be written as, $$T_l = L_s(I^*_{sf} - I_s) - K_{ta}(T^*_f - T_l) - K_{ia}(T_l - T'_l)$$

This allows the controller additional flexibility and dynamic tunability for the purposes of regulation.

Note that while the above description is provided for the case where the control signal is considered the torque command, different embodiments where the control signal is chosen to be the motor current or voltage commands may also be designed. Further, there is no restriction on the form of the control signal, i.e., the control signal is not constrained to be a torque, current or voltage limit and may instead be a scaling factor (for example) on the motor current command, which is further limited from zero to unity. In this way, the supply current controller output becomes a scalar from zero to unity, which reduces the current command when the actual current is above the current limit.

The technical solutions described herein facilitate limitation of the supply current or input power draw by modifying the motor torque or currents utilizing a measurement or estimate of the supply current (the estimate being a closed-loop estimate) and the supply current or input power limit.

Figure 4:
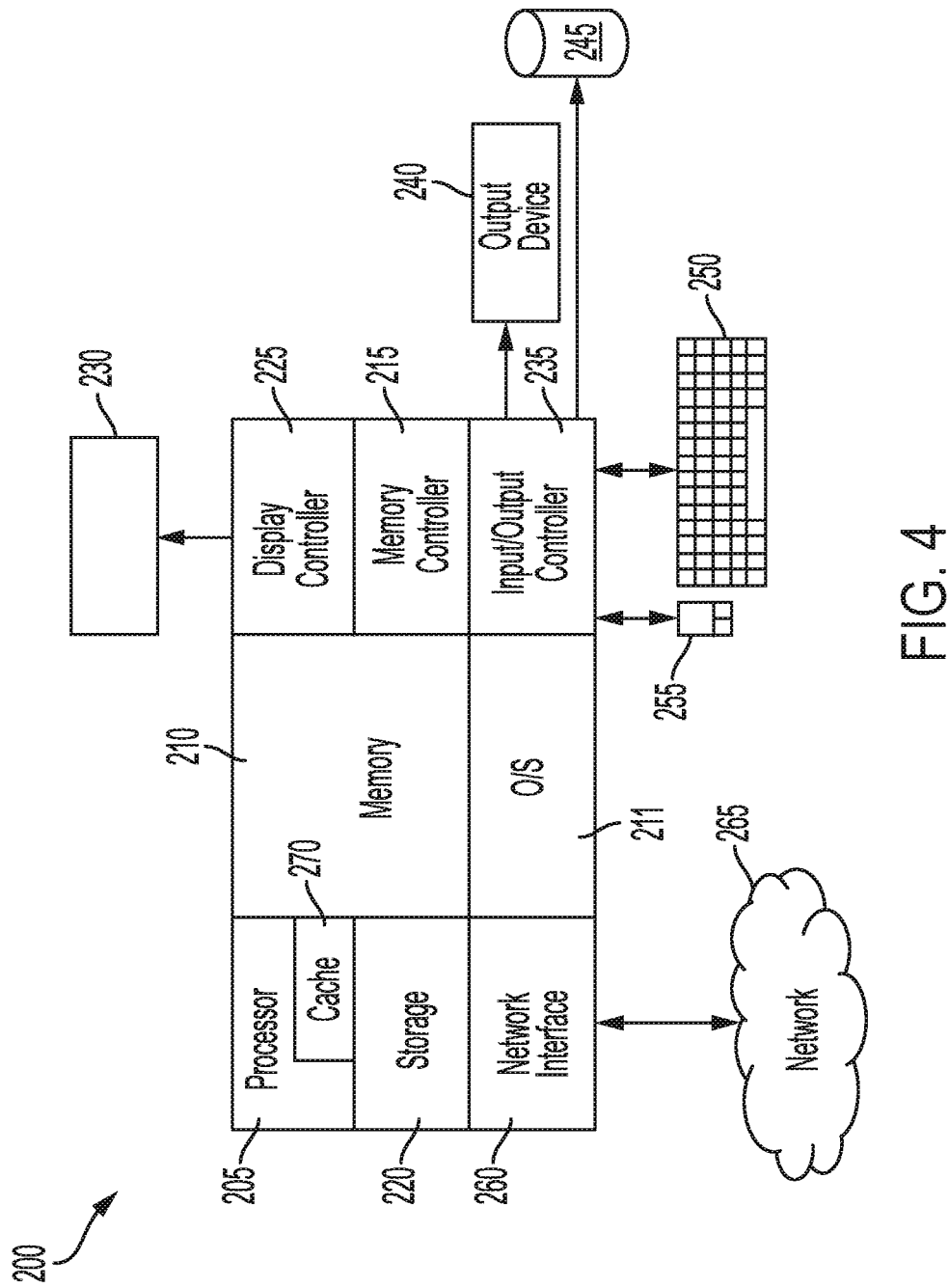
FIG. 4 generally illustrates an example processor according to the principles of the present disclosure.

FIG. 4 generally illustrates a communication apparatus 200, according principles of the present disclosure. The communication apparatus 200 may include a computer, such as a server, a laptop computer, a tablet computer, a phone, and the like. The communication apparatus 200 may be used as any one or more of the apparatus generally illustrated in FIG. 3, such as the user-devices 110, the data correction apparatus 120, the data insight apparatus 130, or a combination thereof.

The communication apparatus 200 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 includes a hardware device for executing hardware instructions or software instructions, particularly those stored in memory 210. The processor 205 may be a custom made or commercially available processor, a central processing unit (CPU), an auxiliary processor among several processors associated with the communication apparatus 200, a semiconductor based microprocessor (in the form of a microchip or chip set), a macro processor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

Figure 2:
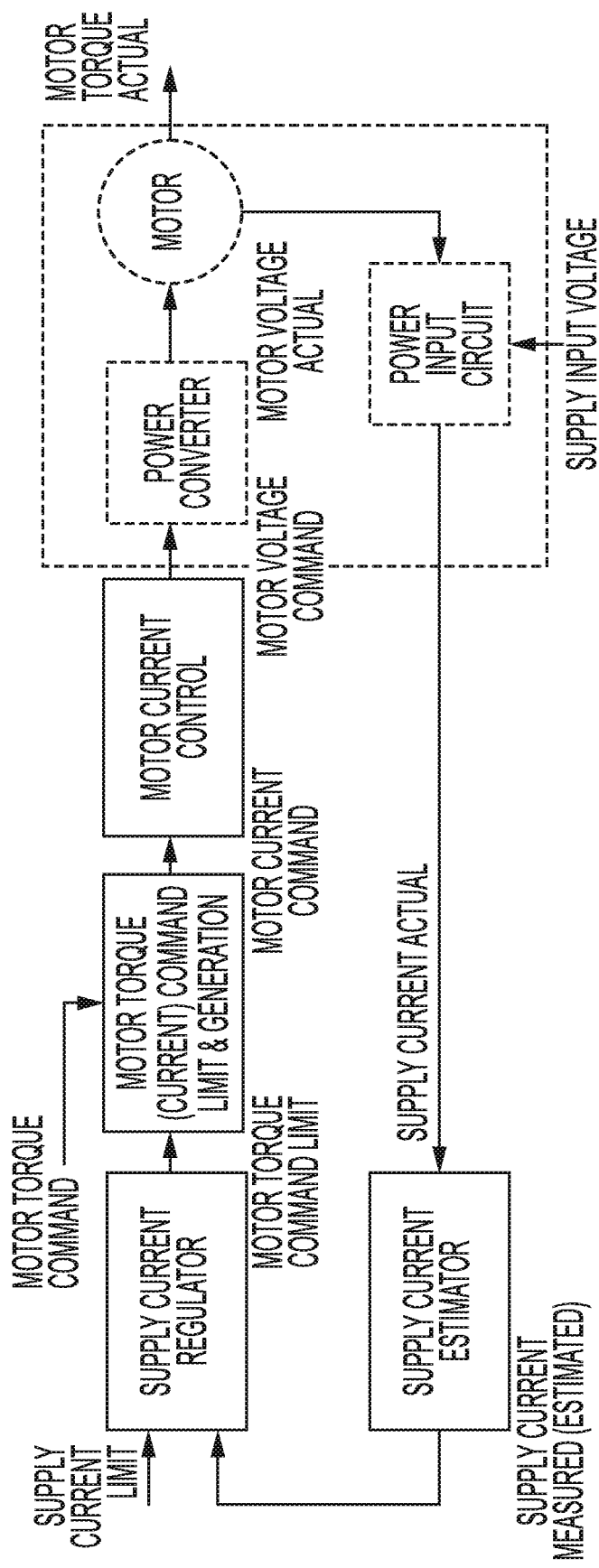
FIG. 2 generally illustrates a block diagram of an example closed-loop control scheme for active power management according to the principles of the present disclosure.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The communication apparatus 200 may further include a display controller 225 coupled to a user interface or display 230. In some embodiments, the display 230 may be an LCD screen. In other embodiments, the display 230 may include a plurality of LED status lights. In some embodiments, the communication apparatus 200 may further include a network interface 260 for coupling to a network 265. The network 265 may be an IP-based network for communication between the communication apparatus 200 and an external server, client and the like via a broadband connection. In an embodiment, the network 265 may be a satellite network. The network 265 transmits and receives data between the communication apparatus 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

In some embodiments, the communication apparatus 200 and/or the controller 16 may perform the methods described herein. However, the methods described herein as performed by communication apparatus 200 and/or the controller 16 are not meant to be limiting, and any type of software executed on a controller can perform the methods described herein without departing from the scope of this disclosure. For example, a processor executing software within a computing device can perform the methods described herein.

Figure 5:
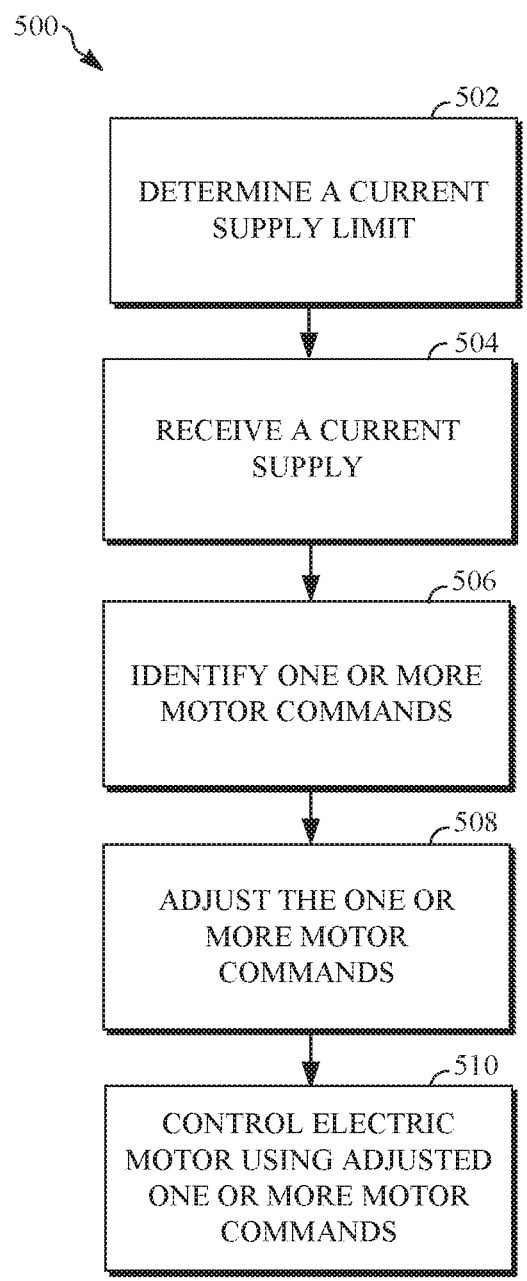
FIG. 5 is a flow diagram illustrating a motor control method according to the principles of the present disclosure.

FIG. 5 is a flow diagram generally illustrating a motor control method 500 according to the principles of the present disclosure. At 502, the method 500 determines a current supply limit. For example, the apparatus 200 and/or the controller 16 may determine a current supply limit for an electric motor. At 504, the method 500 receives a current supply. For example, the apparatus 200 and/or the controller 16 may receive a current supply of the electric motor. In some embodiments, the current supply may include a measured current supply and may be received from a sensor configured to measure a current supply of the electric motor. In some embodiments, the current supply includes an estimated current supply and is received from an observer that estimates the current supply using a model of a power supply circuit configured to supply power to the electric motor. At 506, the method 500 identifies one or more motor commands. For example, the apparatus 200 and/or the controller 16 may identify one or more motor commands. In some embodiments, the one or more motor commands include one or more torque commands provided to the electric motor, one or more current commands provided to the electric motor, one or more other suitable commands, or a combination thereof.

At 508, the method 500 adjusts the one or more motor commands. For example, the apparatus 200 and/or the controller 16 may adjust the one or more motor commands based on the current supply and the current supply limit. For example, the current supply limit may be a positive current. The apparatus 200 and/or the controller 16 may adjust the one or more motor commands in response to a determination that the current supply is greater than the current supply limit. In some embodiments, the systems described herein may include a regenerative current supply. For example, the current supply limit may be negative. The apparatus 200 and/or the controller 16 may be configured to actively control the limit of the current supply when the current supply is less (e.g., more negative) than the current supply limit. Accordingly, the apparatus 200 and/or the controller 16 may adjust the one or more motor commands in response to a determination that the current supply is less than the current supply limit.

At 510, the method 500 controls the electric motor using the adjusted one or more motor commands. For example, the apparatus 200 and/or the controller 16 may selectively control the electric motor using the adjusted one or more motor commands. In some embodiments, the apparatus 200 and/or the controller 16 may selectively control the electric motor using the one or more motor commands in response to a determination that the current supply is less than the current supply limit (e.g., when the current supply limit is positive). In some embodiments, the apparatus 200 and/or the controller 16 may selectively control the electric motor using the one or more motor commands in response to a determination that the current supply is less than the current supply limit (e.g., when the current supply limit is negative). In some embodiments, the apparatus 200 and/or the controller 16 may actively generate a torque limit. The apparatus 200 and/or the controller 16 may limit a base torque command based on the torque limit.

In some embodiments, a motor control system includes a processor and a memory. The memory includes instructions that, when executed by the processor, cause the processor to: determine a current supply limit for an electric motor; receive a current supply of the electric motor; identify one or more motor commands; adjust the one or more motor commands in response to a determination that the current supply is greater than the current supply limit; and selectively control the electric motor using the adjusted one or more motor commands.

In some embodiments, the current supply includes a measured current supply. In some embodiments, the current supply is received from a sensor configured to measure a current supply of the electric motor. In some embodiments, the current supply includes an estimated current supply. In some embodiments, the current supply is received from an observer that estimates the current supply using a model of a power supply circuit configured to supply power to the electric motor. In some embodiments, the one or more motor commands include one or more torque commands provided to the electric motor. In some embodiments, the one or more motor commands include one or more current commands provided to the electric motor. In some embodiments, the instructions further cause the processor to actively generate a torque limit and limit a base torque command based on the torque limit. In some embodiments, the instructions further cause the processor to selectively control the electric motor using the one or more motor commands in response to a determination that the current supply is not greater than the current supply limit.

In some embodiments, a method for motor control includes determining a current supply limit for an electric motor. The method also includes receiving a current supply of the electric motor. The method also includes identifying one or more motor commands. The method also includes adjusting the one or more motor commands based on the current supply and the current supply limit. The method also includes selectively controlling the electric motor using the adjusted one or more motor commands.

In some embodiments, the current supply includes a measured current supply. In some embodiments, the current supply is received from a sensor configured to measure a current supply of the electric motor. In some embodiments, the current supply includes an estimated current supply. In some embodiments, the current supply is received from an observer that estimates the current supply using a model of a power supply circuit configured to supply power to the electric motor. In some embodiments, the one or more motor commands include one or more torque commands provided to the electric motor. In some embodiments, the one or more motor commands include one or more current commands provided to the electric motor. In some embodiments, the method also includes actively generating a torque limit and limiting a base torque command based on the torque limit. In some embodiments, the method also includes selectively controlling the electric motor using the one or more motor commands in response to a determination that the current supply is not greater than the current supply limit. In some embodiments, the current supply limit is positive. In some embodiments, the current supply limit is negative.

In some embodiments, a steering system includes a synchronous motor drive, a processor, and a memory. The synchronous mote drive is associated with a vehicle. The processor is in communication with the synchronous motor drive and configured to selectively control the synchronous drive. The memory that includes instructions that, when executed by the processor, cause the processor to: determine a current supply limit for the synchronous motor drive; receive a current supply of the synchronous motor drive; actively generate a torque limit based on the current supply limit in response to a determination that the current supply is greater than the current supply limit; and selectively control the synchronous motor drive using the torque limit.

In some embodiments, the steering system further includes a sensor configured to: measure current supply of the synchronous motor drive; and communicate the current supply to the processor.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A motor control system comprising:
   a processor; and
   a memory that includes instructions that, when executed by the processor, cause the processor to:
      determine a current supply limit for an electric motor;
      receive a current supply of the electric motor, wherein the current supply includes an estimated current supply, and wherein the current supply is received from an observer that estimates the current supply using a model of a power supply circuit configured to supply power to the electric motor;
      identify one or more motor commands;
      adjust the one or more motor commands in response to a determination that the current supply is greater than the current supply limit; and
      selectively control the electric motor using the adjusted one or more motor commands.

2. The motor control system of claim 1, wherein the current supply includes a measured current supply.

3. The motor control system of claim 2, wherein the current supply is received from a sensor configured to measure a current supply of the electric motor.

4. The motor control system of claim 1, wherein the one or more motor commands include one or more torque commands provided to the electric motor.

5. The motor control system of claim 1, wherein the one or more motor commands include one or more current commands provided to the electric motor.

6. The motor control system of claim 1, wherein the instructions further cause the processor to actively generate a torque limit and limit a base torque command based on the torque limit.

7. The motor control system of claim 1, wherein the instructions further cause the processor to selectively control the electric motor using the one or more motor commands in response to a determination that the current supply is not greater than the current supply limit.

8. A method for motor control comprising:
   determining a current supply limit for an electric motor;
   receiving a current supply of the electric motor, wherein the current supply includes an estimated current supply, and wherein the current supply is received from an observer that estimates the current supply using a model of a power supply circuit configured to supply power to the electric motor;
   identifying one or more motor commands;
   adjusting the one or more motor commands based on the current supply greater and the current supply limit; and
   selectively controlling the electric motor using the adjusted one or more motor commands.

9. The method of claim 8, wherein the current supply includes a measured current supply.

10. The method of claim 9, wherein the current supply is received from a sensor configured to measure a current supply of the electric motor.

11. The method of claim 8, wherein the one or more motor commands include one or more torque commands provided to the electric motor.

12. The method of claim 8, wherein the one or more motor commands include one or more current commands provided to the electric motor.

13. The method of claim 8, wherein the current supply limit is positive.

14. The method of claim 8, wherein the current supply limit is negative.

15. A steering system comprising:
a synchronous motor drive of a vehicle;
a processor in communication with the synchronous motor drive and configured to selectively control the synchronous motor drive; and
a memory that includes instructions that, when executed by the processor, cause the processor to:
determine a current supply limit for the synchronous motor drive;
receive a current supply of the synchronous motor drive, wherein the current supply includes an estimated current supply, and wherein the current supply is received from an observer that estimates the current supply using a model of a power supply circuit configured to supply power to the synchronous motor drive;
actively generate a torque limit based on the current supply limit in response to a determination that the current supply is greater than the current supply limit; and
selectively control the synchronous motor drive using the torque limit.

16. The steering system of claim 15, further comprising a sensor configured to:
measure current supply of the synchronous motor drive; and
communicate the current supply to the processor.

* * * * *